United States Patent [19]

Lau et al.

[11] Patent Number: 5,135,962

[45] Date of Patent: Aug. 4, 1992

[54] INTERNAL MOLD RELEASE AGENT FOR USE IN POLYUREA RIM SYSTEMS

[75] Inventors: Cliff J. Lau, Sewickley; Frank Sanns, Pittsburgh, both of Pa.

[73] Assignee: Miles Inc., Pittsburgh, Pa.

[21] Appl. No.: 505,797

[22] Filed: Apr. 6, 1990

[51] Int. Cl.$^5$ .......................... C08G 18/08; C08J 9/00
[52] U.S. Cl. .................... 521/163; 521/124; 521/155; 521/174; 528/55; 264/51; 264/328.1; 264/328.6
[58] Field of Search ............ 521/124, 125, 155, 163, 521/174; 264/51, 328.1, 328.6, 328.8; 252/182; 528/55

[56] References Cited

U.S. PATENT DOCUMENTS

| | | | |
|---|---|---|---|
| 4,433,067 | 2/1984 | Rice et al. | 521/51 |
| 4,444,910 | 4/1984 | Rice et al. | 521/51 |
| 4,519,965 | 5/1985 | Taylor et al. | 521/125 |
| 4,530,941 | 7/1985 | Turner et al. | 521/176 |
| 4,585,803 | 4/1986 | Nelson et al. | 521/124 |
| 4,758,604 | 7/1988 | Barron | 521/125 |
| 4,774,263 | 9/1988 | Weber et al. | 521/51 |
| 4,774,264 | 9/1988 | Weber et al. | 521/51 |
| 4,868,224 | 9/1989 | Harasin et al. | 521/124 |
| 4,886,838 | 12/1989 | Dewhurst | 521/117 |
| 4,897,428 | 1/1990 | Dewhurst et al. | 521/124 |
| 4,965,293 | 10/1990 | Sanns, Jr. | 521/124 |
| 4,983,643 | 1/1991 | Sanna, Jr. | 521/159 |

*Primary Examiner*—John Kight, III
*Assistant Examiner*—John M. Cooney, Jr.
*Attorney, Agent, or Firm*—Joseph C. Gil

[57] ABSTRACT

The present invention is directed to a process for the production of optionally cellular, polyurea elastomer moldings by reacting a reaction mixture containing I) a polyisocyanate,
II) a polyether having at least two isocyanate-reactive groups and a molecular weight of 1800 to 12,000 in which at least 50% of the isocyanate-reactive groups are primary and/or secondary amino groups,
III) about 5 to 50% by weight, based on the weight of component (II) of a chain extender comprising a sterically hindered aromatic diamine and
IV) about 0.5 to 20% by weight, based on the weight of components (II) and (III) of a zinc carboxylate containing from 10 to 14 carbon atoms per carboxylate group, and the reaction mixture is processed at a one-shot system by the RIM process at an isocyanate index of about 70 to 130.

The present invention is also directed to an isocyanate-reactive component for use in a RIM process based on components (II), (III) and (IV).

9 Claims, No Drawings

INTERNAL MOLD RELEASE AGENT FOR USE IN POLYUREA RIM SYSTEMS

BACKGROUND OF THE INVENTION

1. Field of the Invention

The present invention relates to an internal mold release agent for use in a reaction injection molding process for the preparation of optionally cellular, polyurea elastomer moldings.

2. Description of the Prior Art

Reaction injection molding process for the production of optionally cellular polyurea elastomers have been described in U.S. Pat. Nos. 4,433,067, 4,444,910, 4,530,941, 4,774,263 and 4,774,264. Finally, U.S. Pat. Nos. 4,519,965, 4,581,386, and 4,876,019 are directed to the use of internal mold release agent mixtures for either polyurethane and/or polyurea elastomers which are based on a zinc carboxylate and a solubilizer to maintain the zinc carboxylate in solution in the isocyanate-reactive component used to prepare the elastomer.

One of the problems with this latter mold release agent mixture, especially in systems for the preparation of polyurea elastomers, is that parts prepared using the zinc stearate-based internal mold release agent require special treatment after they are removed from the mold and before painting in order to remove excess mold release agent from the surface of the part to improve its paintability. Furthermore, even after cleaning and drying the part, it has been found that the zinc stearate bleeds to the surface which results in molded part which is difficult, if not impossible to subsequently paint.

U.S. Pat. No. 4,886,838 describes the use of a salt of an amidine and a phenolic hydroxyl containing compound to solubilize a zinc carboxylate containing form 8 to 24 carbon atoms per carboxylate group. The resultant mixture is used in a RIM process. In the examples, the reference does describe the use of zinc laurate in combination with the salts noted.

It is an object of the present invention to provide an internal mold release agent which does not suffer from the disadvantages of the prior art mold release agents when used for the production of polyurea elastomers and which does not require the amidine solubilizer of the prior art. It has surprisingly been found that this object may be achieved in accordance with the present invention by using zinc salts described hereinafter as internal mold release agents in the production of optionally cellular, polyurea elastomers.

SUMMARY OF THE INVENTION

The present invention is directed to a process for the production of optionally cellular, polyurea elastomer moldings by reacting a reaction mixture consisting essentially of:

I) a polyisocyanate,
II) a polyether having at least two isocyanate-reactive groups and a molecular weight of 1800 to 12,000 in which at least 50% of the isocyanate-reactive groups are primary and/or secondary amino groups,
III) about 5 to 50% by weight, based on the weight of component (II) of a chain extender comprising a sterically hindered aromatic diamine and
IV) about 0.5 to 20% by weight, based on the weight of components (II) and (III) of zinc carboxylate having from 10 to 14 carbon atoms per carboxylate group, The present invention is also directed to an isocyanate-reactive component for use in a RIM process based on components (II), (III) and (IV).

DETAILED DESCRIPTION OF THE INVENTION

As used herein, the term "polyurea" refers not only to pure polyureas, i.e., polyisocyanate polyaddition products prepared exclusively from polyisocyanates and polyamines, but also to polyisocyanate polyaddition products prepared from polyamines and other compounds containing isocyanate-reactive groups such as polyhydroxyl compounds, provided that at least 50% of the isocyanate-reactive groups are primary and/or secondary amino groups.

The polyisocyanate component (I) to be used in accordance with the present invention may be an aliphatic, cycloaliphatic, araliphatic or preferably an aromatic polyisocyanate, i.e., a polyisocyanate in which all of the isocyanate groups are aromatically bound. Examples of aromatic polyisocyanates include 2,4- and/or 2,6-diisocyanatotoluene; 2,2'-, 2,4'- and/or 4,4'-diisocyanatodiphenylmethane, mixtures of the last-mentioned isomers with their higher homologs (such as those obtained by phosgenating aniline/formaldehyde condensates); compounds containing urethane groups obtained as products of reaction of the above-mentioned di- and/or polyisocyanates with subequivalent quantities of aliphatic polyhydroxyl compounds having molecular weights of 62 to 700, (e.g. ethylene glycol, trimethylol propane, propylene glycol, dipropylene glycol or polypropylene glycols within the above-mentioned molecular weight range); di- and/or polyisocyanates modified by the partial carbodiimidization of the isocyanate groups of the above-mentioned di- and/or polyisocyanates; methyl-substituted diisocyanates of the diphenyl methane series or mixtures thereof (for example, those described in European Published Application No. 0,024,665); or any mixtures of such aromatic di- and polyisocyanates.

Included among the preferred isocyanate starting materials are the derivatives of 4,4'-diisocyanatodiphenylmethane which are liquid at room temperature. Specific examples of such compounds are polyisocyanates containing urethane groups obtainable according to German Patent 1,618,380 (U.S. Pat. No. 3,644,457) by reacting one mole of 4,4'-diisocyanatodiphenylmethane with about 0.05 to 0.3 moles of low molecular weight diols or triols, preferably polypropylene glycols having a molecular weight below 700; and diisocyanates based on 4,4'-diisocyanatodiphenylmethane containing carbodiimide and/or uretone imine groups such as those disclosed in U.S. Pat. Nos. 3,152,162, 3,384,653, 3,449,256, and 4,154,752, and German Offenlegungsschrift No. 2,537,685. Also included among the preferred polyisocyanates are the corresponding modification products based on mixtures of 2,4'- and 4,4'-diisocyanatodiphenylmethane or mixtures of the above-described modified 4,4'-diisocyanatodiphenylmethanes with minor quantities of higher than difunctional polyisocyanates of the diphenylmethane series. Such polyisocyanates are described in German Offenlegungsschrift 2,624,526. The preferred polyisocyanates are generally polyisocyanates or polyisocyanate mixtures of the diphenylmethane series which are liquid at room temperature and have optionally been chemically modified as described above, have an average isocyanate functionality of 2 to 2.2 (preferably 2) and contain 4,4'-diisocyanatodiphenylmethane as the main component (preferably in an amount of more than 50% by weight).

The polyethers (component II) to be used in accordance with the present invention contain at least two isocyanate-reactive groups in end positions and have an average molecular weight (calculated from the functionality and the isocyanate-reactive group content) of about 1800 to 12,000, preferably about 2000 to 8000. At least about 50 equivalent %, preferably about 80 to 100 equivalent % of the isocyanate-reactive end groups are primary and/or secondary (preferably primary) aromatically or aliphatically bound amino groups with the remainder being primary and/or secondary aliphatically bound hydroxyl groups. When polyether mixtures are used, individual components of the mixture may have a molecular weight below 1800 (for example between 500 and 1800), provided that the average molecular weight of the mixtures is within the range of 1800 to 12,000. The use of mixtures containing large quantities of individual components which have molecular weights below 1800 is, however, not preferred, even when the average molecular weight is within the disclosed ranges.

Compounds containing amino end groups may be prepared by the conversion of existing end groups or they may be attached to the polyether chain by urethane, ether or ester groups. Suitable polyether polyols for preparing the amine-terminated polyethers are known and disclosed in U.S. Pat. Nos. 4,305,857 and 4,218,543, both of which are herein incorporated by reference.

The "amino polyethers" may be prepared by known methods. One such method is the amination of polyhydroxy polyethers (e.g., polypropylene glycol ethers) by reaction with ammonia in the presence of Raney nickel and hydrogen (Belgium Patent No. 634,741). U.S. Pat. No. 3,654,370 discloses the preparation of polyoxyalkylene polyamines by reaction of the corresponding polyol with ammonia and hydrogen in the presence of a nickel, copper or chromium catalyst. The preparation of polyethers containing amino end groups by the hydrogenation of cyanoethylated polyoxypropylene ethers is described in German Patent 1,193,671. Other methods for the preparation of polyoxyalkylene (polyether) amines are described in U.S. Pat. Nos. 3,155,728 and 3,236,895 and French Patent No. 1,551,605. French Patent No. 1,466,708 discloses the preparation of polyethers containing secondary amino end groups.

Relatively high molecular weight polyhydroxy polyethers suitable for the process of the present invention may be converted into the corresponding anthranilic acid esters by reaction with isatoic acid anhydride. German Offenlegungsschriften 2,019,432 and 2,619,840 and U.S. Pat. Nos. 3,808,250; 3,975,428; and 4,016,143 disclose methods for making polyethers containing aromatic end groups.

Relatively high molecular weight compounds containing amino end groups may be obtained according to German Offenlegungsschrift 2,546,536 or U.S. Pat. No. 3,865,791 by reacting isocyanate prepolymers based on polyhydroxy polyethers with hydroxyl-containing enamines, aldimines or ketimines and hydrolyzing the reaction product.

Amino polyethers which have been obtained by the hydrolysis of compounds containing isocyanate end groups (U.S. Pat. No. 4,774,263, herein incorporated by reference in its entirety) are preferred starting materials and can be used alone or in admixture with other amino polyethers, especially those obtained by the amination of polyether polyols. To prepare these amino polyethers by the hydrolysis of isocyanate groups, polyethers preferably containing two or three hydroxyl groups are reaction with excess quantities of polyisocyanates to form isocyanate-terminated prepolymers and the isocyanate groups are then converted in a second step into amino groups by hydrolysis. Other patents relating to the preparation of these amino polyethers include U.S. Pat. Nos. 4,532,317; 4,506,039; 4,540,270; 4,565,645; 4,525,534; 4,515,923; 4,525,590; 4,501,873; 4,578,500; 4,386,218; 4,472,568; 4,532,266; and 4,456,730. Additional methods are disclosed in European Patent Applications 217,247; 178,525; 97,299; 75,770; 219,035; and 218,053.

Also preferred are polyethers containing amino phenoxy end groups and having a low viscosity. These aminopolyethers may be economically prepared in accordance with German Offenlegungsschrift 3,713,858, and may be used alone or in admixture with the other previously described aminopolyethers.

The "amino polyethers" used in accordance with the present invention are in many cases mixtures of the compounds described above. These mixtures generally should contain (on a statistical average) two to three isocyanate-reactive end groups. In the process of the present invention, the "amino polyethers" may also be used as mixtures with polyhydroxy polyethers which are free from amino groups (such as those previously disclosed as precursors for the amino polyethers, or highly branched polyether polyols having an average hydroxyl functionality of about 3 to 6 and molecular weights of about 500 to 1000), although such mixtures are less preferred. If such mixtures are used, however, it is necessary to ensure that at least about 50 equivalent % of the isocyanate reactive groups present in the mixture are primary and/or secondary amino groups. It is also possible to use mixed amino/hydroxyl polyethers, i.e., polyethers containing both amino and hydroxyl groups, provided that at least 50% of the isocyanate-reactive groups in the polyether component are primary and/or secondary amino groups. These mixed amino/-hydroxyl polyethers may be prepared, e.g., by aminating only a portion of the hydroxyl groups of a polyether polyol.

Suitable chain extenders (component III) include the known low molecular isocyanate-reactive compounds such as aromatic polyamines, especially diamines, having molecular weights of less than about 800, preferably less than about 500.

Preferred chain extenders include the sterically hindered aromatic diamines which contain at least one linear or branched alkyl substituent in the ortho position to the first amino group and at least one, preferably two, linear or branched alkyl substituents containing at least one, preferably one to three carbon atoms in the ortho position to the second amino group. These aromatic diamines include 1-methyl-3,5-diethyl2,4-diaminobenzene, 1-methyl-3,5-diethyl-2,6-diaminobenzene, 1,3,5-trimethyl-2,4-diaminobenzene, 1-methyl-5-t-butyl-2,4-diaminobenzene, 1-methyl-5-t-butyl-2,6-diaminobenzene, 1,3,5-triethyl-2,4-diaminobenzene, 3,5,3',5'-tetraethyl-4,4'-diaminodiphenylmethane, 3,5,3',5'-tetraisopropyl-4,4'-diaminodiphenylmethane, 3,5-diethyl-3',5'-diisopropyl-4,4'-diaminodiphenylmethane, 3,3'-diethyl-5,5'-diisopropyl-4,4'-diaminodiphenylmethane, 1-methyl-2,6-diamino-3-isopropylbenzene and mixtures of the above diamines. Most preferred are mixtures of 1-methyl-3,5-diethyl-2,4-diaminobenzene and 1-methyl-3,5-diethyl-2,6-diaminobenzene in a weight ratio between about 50:50 to 85:15, preferably about 65:35 to 80:20.

In addition, unhindered aromatic polyamines may be used in admixture with the sterically hindered chain extenders and include 2,4- and or 2,6-diaminotoluene, 2,4'- and/or 4,4'-diaminodiphenylmethane, 1,2- and 1,4-phenylene diamine, naphthalene-1,5-diamine and triphenyl methane-4,4',4"-triamine. The difunctional and polyfunctional aromatic amine compounds may also exclusively or partly contain secondary amino groups such as 4,4'-di-(methylamino)-diphenylmethane or 1-methyl-2-methylamino-4-aminobenzene. Liquid mixtures of polyphenyl polymethylene polyamines of the type obtained by condensing aniline with formaldehyde are also suitable. Generally the nonsterically hindered aromatic diamines and polyamines are too reactive to provide sufficient processing time in a RIM system. Accordingly, these diamines and polyamines should be used in combination with one or more of the previously mentioned sterically hindered diamines.

The chain extender (III) is used in quantities of about 5 to 50%, preferably about 8 to 30% and most preferably about 12 to 26% by weight, based on the weight of the high molecular weight isocyanate-reactive component (II).

Suitable zinc carboxylates are those containing from 10 to 14 carbon atoms per carboxylate group. Suitable materials include zinc laurate, zinc decanoate, and zinc tetradecanoate with zinc laurate being preferred. The carboxylates are generally present in an amount of about 0.5 to 20% by weight, preferably about 1 to 15% by weight and more preferably about 1 to 10% by weight, based on the weight of components (II) and (III), in order to obtain mold release properties.

If desired, tertiary amine containing solubilizers of the type described in U.S. Pat. No. 4,581,386, can also be used. Other auxiliary agents and additives including additional internal mold release agents, reinforcing agents, blowing agents, catalysts, surface active additives (emulsifiers and foam stabilizers), reaction retarders, cell regulators, fillers, pigments, flame retardant agents, age resistors, stabilizers to protect against weathering, plasticizers, fungistatic and bacteriostatic substances, may also be included in the compositions according to the present invention. Examples of these types of auxiliary agents and additives are set forth in U.S. Pat. Nos. 4,254,228 and 4,581,386, both of which are herein incorporated by reference in their entireties. In addition, these additives have been described in Kunststoff-Handbuch, Vol. VI, published by Vieweg and Höchtlen, Carl-Hanser-Verlag, Munich, 1966, e.g. on pages 103 to 113.

The compositions according to the present invention may be molded using conventional RIM processing techniques. In general, two separate streams are intimately mixed and subsequently injected into a suitable mold, although it is possible to use more than two streams. The first stream contains the polyisocyanate component (I), while the second stream contains the high molecular weight isocyanate-reactive component (II), the chain extender (III), the internal mold release agent (IV) and generally any other additive which is to be included.

Prior to use, the mold release agent may be blended with the remainder of the isocyanate-reactive components of the second stream and agitated briefly to ensure homogeneity. If used, a reinforcing agent may be added to the resin blend at this time.

The invention is further illustrated, but is not intended to be limited by the following examples in which all parts and percentages are by weight unless otherwise specified.

EXAMPLES

Description of Materials

Polyol: A glycerine-initiated poly(oxyalkylene)-polyether triol having an OH number of 35 and prepared from 83 wt. % propylene oxide followed by 17% ethylene oxide.

D-2000: an amine terminated polyether supplied by Texaco having a functionality of 2 and a molecular weight of 2000.

T-5000: an amine terminated polyether supplied by Texaco having a functionality of 3 and a molecular weight of 5000.

DETDA: A commercial preparation of diethyl toluene diamine (DETDA) which is an isomeric mixture of 1-methyl-3,5-diethyl-2,4-diaminobenzene and 1-methyl-3,5-diethyl-2,6-diaminobenzene in a ratio between 65:35 and 80:20.

TETROL: An amine-initiated poly(oxyalkylene)-polyether tetrol having a hydroxyl number of about 630 and obtained by the addition of about 5 moles of propylene oxide to one mole of ethylene diamine.

Surfactant: A commercial silicone surfactant supplied as L-5304 by Union Carbide.

ISO: An isocyanate-terminated prepolymer having an NCO content of 17.5% and prepared by reacting (i) a phosgenated aniline/formaldehyde condensation product containing 82.5% of 4,4'-diphenylmethane-diisocyanate, 5% of the 2,4'-isomer and the remainder higher functional homologs, with (ii) Polyol.

ZNL: zinc laurate

ZNS: zinc stearate

A resin blend was prepared from 46.2 parts of T-5000, 19.8 parts of D-2000, 31.7 parts of DETDA, 1.7 parts of ZNS, and 0.6 parts of Surfactant, and reaction injection molded with ISO at an isocyanate index of 105 in a Cincinnati Milacron RIM-90 using a 24"×36" plaque tool. The tool was precoated with RCTW2006, a commercially available soap from Chemtrend. Twenty plaques were made. Half of the plaques were post cured at 250 F. for 1 hour, while the other half were left at room temperature (i.e., no post curing).

A second resin blend was produced identical to the first, except that 1.7 parts of ZNL were substituted for the 1.7 parts of ZNS. The second resin blend was molded in the same manner and the twenty plaques made were treated in the same manner.

| Mixhead Type | Adjustable |
| --- | --- |
| Injection Rate, pounds per second | 5.5 |
| Part Weight, pound | 4.5 |
| Mold Temperature, °F. | 158 |
| Material Temperature, °F. | |
| Polyisocyanate Component | 119 |
| Resin Component | 105 |
| Mix Pressures, psi | |
| Polyisocyanate Component | 1900–2000 |
| Resin Blend Component | 1900–2000 |
| Demold Time, seconds | 30 |

Three days later, one unpostcured plaque from each blend was postcured at 250 F. for 1 hour. These two plaques and two plaques which had been postcured the previous day (one plaque from each blend) were then cut into 4"×12" panels (12 panels were cut for each of the four different plaques), and processed in the following order:
1) power washed with tap water at 120 F. for 30 seconds,
2) power washed with (3%) Benchmark 1836 (phosphoric acid cleaner), available from Benchmark, at 120 F. for 30 seconds,
3) tap water rinse at 100 F. for 8 seconds,
4) tap water rinse at room temperature for 45 seconds, and
5) de-ionized water rinse at room temperature for 8 seconds.

Two panels of each of the four different plaques were allowed to dry at room temperature and were then painted using an air spray gun with PPG 602-1060F primer (one pass only). The paint flowed well and coated each panel uniformly (i.e., each panel had good "wet out"). The surface of the panels appeared to be clean.

In a commercial operation, air drying is not generally used. Accordingly, in order to view performance as used in a commercial operation, following the washing steps, panels were oven dried. Four panels of each each of the four different plaques were dried in an oven at 160 F. for 20 minutes, and then allowed to cool to room temperature. The panels were then coated with PPG 602-1060F using an air spray gun. The panels based on zinc laurate had good wet out. The panels based on the zinc stearate formulation had poor paint wet out (i.e., the paint did not uniformly cover the panels).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of an optionally cellular, polyurea elastomer molding which comprises reacting a reaction mixture consisting essentially of:
   I) a polyisocyanate,
   II) a polyether having at least two isocyanate-reactive groups and a molecular weight of 1800 to 12,000 in which at least 50% of the isocyanate-reactive groups are primary and/or secondary amino groups,
   III) about 5 to 50% by weight, based on the weight of component (II), of a chain extender comprising a sterically hindered aromatic diamine and
   IV) about 0.5 to 20% by weight, based on the weight of components (II) and (III), of a zinc carboxylate containing form 10 to 14 carbon atoms per carboxylate group and the reaction mixture is processed as a one-shot system by the RIM process at an isocyanate index of about 70 to 130.

2. The process of claim 1 wherein about 80 to 100% of the isocyanate-reactive groups of component (II) are primary and/or secondary amino groups.

3. The process of claim 1 wherein said chain extender comprises an isomeric mixture of 1-methyl-3,5-diethyl-2,4-diaminobenzene and 1-methyl-3,5-diethyl-2,6-diaminobenzene.

4. The process of claim 1 wherein said carboxylate is zinc laurate.

5. The process of claim 1 wherein said reaction mixture additionally contains a reinforcing agent.

6. An isocyanate-reactive component which is suitable for the production of an optionally cellular, polyurea elastomer molding and consists essentially of:
   II) a polyether having at least two isocyanate-reactive groups and a molecular weight of 1800 to 12,000 in which at least 50% of the isocyanate-reactive groups are primary and/or secondary amino groups,
   III) about 5 to 50% by weight, based on the weight of component (ii), of a chain extender comprising a sterically hindered aromatic diamine and
   IV) about 0.5 to 20% by weight, based on the weight of components (II) and (III), of a zinc carboxylate containing from 10 to 14 carbon atoms.

7. The isocyanate-reactive component of claim 6 wherein about 80 to 100% of the isocyanate-reactive groups of component (II) are primary and/or secondary amino groups.

8. The isocyanate-reactive component of claim 6 wherein said chain extender comprises an isomeric mixture of 1-methyl-3,5-diethyl-2,4-diamino-benzene and 1-methyl-3,5-diethyl-2,6-diaminobenzene.

9. The isocyanate-reactive component of claim 6 wherein said carboxylate is zinc laurate.

* * * * *